(12) United States Patent
Li et al.

(10) Patent No.: US 11,249,331 B2
(45) Date of Patent: Feb. 15, 2022

(54) REFRACTIVE INDEX ADJUSTMENT STRUCTURE, COLOR FILTER SUBSTRATE, DISPLAY PANEL AND DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Ning Li, Beijing (CN); Jianming Jiang, Beijing (CN); Wei Gu, Beijing (CN); Tengli Wang, Beijing (CN); Daqing Sun, Beijing (CN); Ganlin Ruan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 558 days.

(21) Appl. No.: 16/304,366

(22) PCT Filed: Mar. 2, 2018

(86) PCT No.: PCT/CN2018/077861
§ 371 (c)(1),
(2) Date: Nov. 26, 2018

(87) PCT Pub. No.: WO2019/007088
PCT Pub. Date: Jan. 10, 2019

(65) Prior Publication Data
US 2021/0223643 A1    Jul. 22, 2021

(30) Foreign Application Priority Data

Jul. 6, 2017 (CN) .......................... 201710546228.4

(51) Int. Cl.
*G02F 1/13* (2006.01)
*G02F 1/1362* (2006.01)
(Continued)

(52) U.S. Cl.
CPC ...... *G02F 1/1323* (2013.01); *G02F 1/136222* (2021.01); *G02F 1/136286* (2013.01); *G02F 1/167* (2013.01); *G02F 1/1673* (2019.01)

(58) Field of Classification Search
None
See application file for complete search history.

(56) References Cited

U.S. PATENT DOCUMENTS 7,265,910 B2   9/2007   Ito et al.
9,939,707 B2   4/2018   Loxley et al.
(Continued)

FOREIGN PATENT DOCUMENTS

CN   101261390 A   9/2008
CN   101517466 A   8/2009
(Continued)

OTHER PUBLICATIONS

International Search Report dated May 31, 2018 corresponding to application No. PCT/CN2018/077861.
(Continued)

*Primary Examiner* — Shan Liu
(74) *Attorney, Agent, or Firm* — Nath, Goldberg & Meyer; Joshua B. Goldberg

(57) ABSTRACT

Disclosed are a refractive index adjustment structure, a color filter substrate, a display panel and a display apparatus. The refractive index adjustment structure includes an adjustment layer and at least one electrode layer. The adjustment layer and the at least one electrode layer are provided in a stacked manner. The at least one electrode layer is configured to be loaded with an electric signal, and the electric signal is
(Continued)

capable of adjusting a refractive index of the adjustment layer.

18 Claims, 3 Drawing Sheets

(51) Int. Cl.
*G02F 1/167* (2019.01)
*G02F 1/1673* (2019.01)

(56) References Cited

U.S. PATENT DOCUMENTS

| | | | |
|---|---|---|---|
| 10,386,691 B2* | 8/2019 | Zhang | G09G 3/344 |
| 2002/0063829 A1* | 5/2002 | Manabe | G02F 1/133632 |
| | | | 349/117 |
| 2006/0044448 A1* | 3/2006 | Kato | G02F 1/167 |
| | | | 348/335 |
| 2006/0050412 A1 | 3/2006 | Ito et al. | |
| 2007/0296909 A1* | 12/2007 | Nagato | G02F 1/167 |
| | | | 349/162 |
| 2008/0117496 A1* | 5/2008 | Park | G02F 1/1677 |
| | | | 359/296 |
| 2011/0211345 A1* | 9/2011 | De Boer | G02F 1/167 |
| | | | 362/235 |
| 2012/0293503 A1* | 11/2012 | Miyazawa | H04N 13/359 |
| | | | 345/419 |
| 2015/0077836 A1* | 3/2015 | Yamazaki | G02F 1/1677 |
| | | | 359/296 |
| 2016/0170129 A1* | 6/2016 | Xu | G02B 6/0055 |
| | | | 349/42 |
| 2018/0039144 A1* | 2/2018 | Hao | G02F 1/133514 |
| 2018/0217438 A1* | 8/2018 | Niu | G02F 1/29 |

FOREIGN PATENT DOCUMENTS

| | | |
|---|---|---|
| CN | 101790700 A | 7/2010 |
| CN | 102645812 A | 8/2012 |
| CN | 106290254 A | 1/2017 |
| CN | 107092127 A | 8/2017 |
| JP | 2005345644 A | 12/2005 |
| JP | 2016525706 A | 8/2016 |
| WO | 2008/032248 A1 | 3/2008 |
| WO | WO-2008032248 A1 * | 3/2008 ............ G02F 1/195 |

OTHER PUBLICATIONS

Office Action dated Jun. 17, 2019 issued in corresponding Chinese Application No. 201710546228.4.

* cited by examiner

REFRACTIVE INDEX ADJUSTMENT STRUCTURE, COLOR FILTER SUBSTRATE, DISPLAY PANEL AND DISPLAY APPARATUS

CROSS-REFERENCE TO RELATED APPLICATION

This is a National Phase Application filed under 35 U.S.C. 371 as a national stage of PCT/CN2018/077861, filed Mar. 2, 2018, an application claiming the benefit of Chinese Application No. 201710546228.4, filed Jul. 6, 2017, the entire contents of which are hereby incorporated by reference.

TECHNICAL FIELD

The present disclosure relates to the field of display technology, and particularly, to a refractive index adjustment structure, a color filter substrate, a display panel, and a display apparatus.

BACKGROUND

The liquid crystal display (LCD) apparatus includes a liquid crystal display panel and a backlight module for providing a light source. Light emitted from the backlight module irradiates onto the liquid crystal display panel and exits from the liquid crystal display panel at a certain angle after being refracted by the liquid crystal display panel.

SUMMARY

The following is a summary of subject matters described in detail herein. This summary is not intended to limit the protection scope of the claims.

Embodiments of the present disclosure provide a refractive index adjustment structure including an adjustment layer and at least one electrode layer. The adjustment layer and the at least one electrode layer are provided in a stacked manner. The at least one electrode layer is configured to be loaded with an electric signal, and the electric signal is capable of adjusting a refractive index of the adjustment layer.

In some embodiments, the at least one electrode layer includes a first electrode layer, and the adjustment layer is a first adjustment layer doped with magnetic particles. The first electrode layer is configured to generate a magnetic field based on the electric signal, and the magnetic field is capable of adjusting distribution of the magnetic particles in the first adjustment layer in a direction perpendicular to the first electrode layer.

In some embodiments, in response to the electric signal loaded onto the first electrode layer, a portion of the first adjustment layer close to the first electrode layer has a refractive index larger than a refractive index of a portion of the first adjustment layer away from the first electrode layer.

In some embodiments, in the absence of the electric signal in the first electrode layer, the magnetic particles are uniformly distributed in the first adjustment layer.

In some embodiment, the at least one electrode layer includes a first electrode layer and a second electrode layer, the adjustment layer is a first adjustment layer doped with magnetic particles, the first adjustment layer is between the first electrode layer and the second electrode layer, and the electric signal is loaded onto the first electrode layer or the second electrode layer. The first electrode layer is configured to generate a first magnetic field based on the electric signal, and the first magnetic field is capable of adjusting distribution of the magnetic particles in the first adjustment layer in a direction perpendicular to the first electrode layer. The second electrode layer is configured to generate a second magnetic field based on the electric signal, and the second magnetic field is capable of adjusting the distribution of the magnetic particles in the first adjustment layer in a direction perpendicular to the second electrode layer.

In some embodiments, in response to the electric signal loaded onto the first electrode layer, a portion of the first adjustment layer close to the first electrode layer has a refractive index larger than a refractive index of a portion of the first adjustment layer away from the first electrode layer; and in response to the electric signal loaded onto the second electrode layer, a portion of the first adjustment layer close to the second electrode layer has a refractive index larger than a refractive index of a portion of the first adjustment layer away from the second electrode layer.

In some embodiments, in the absence of the electric signal in both of the first electrode layer and the second electrode layer, the magnetic particles are uniformly distributed in the first adjustment layer.

In some embodiments, the at least one electrode layer includes a third electrode layer and a fourth electrode layer, the adjustment layer is a second adjustment layer doped with charged particles, and the second adjustment layer is between the third electrode layer and the fourth electrode layer. The electric signal includes a first electric signal and a second electric signal, the third electric layer is configured to be loaded with the first electric signal and the fourth electrode layer is configured to be loaded with the second electric signal. The third electrode layer and the fourth electrode layer are configured to generate an electric field based on the first electric signal and the second electric signal, and the electric field is capable of adjusting distribution of the charged particles in the second adjustment layer in a direction perpendicular to the third and fourth electrode layers.

In some embodiments, the charged particles are positively charged particles. In a case where the first electric signal is higher than the second electric signal, a portion of the second adjustment layer close to the third electrode layer has a refractive index smaller than a refractive index of a portion of the second adjustment layer close to the fourth electrode layer; and in a case where the first electric signal is lower than the second electric signal, the portion of the second adjustment layer close to the third electrode layer has a refractive index larger than a refractive index of the portion of the second adjustment layer close to the fourth electrode layer.

In some embodiments, the charged particles are negatively charged particles. In a case where the first electric signal is lower than the second electric signal, a portion of the second adjustment layer close to the third electrode layer has a refractive index smaller than a refractive index of a portion of the second adjustment layer close to the fourth electrode layer; and in a case where the first electric signal is higher than the second electric signal, the portion of the second adjustment layer close to the third electrode layer has a refractive index larger than a refractive index of the portion of the second adjustment layer close to the fourth electrode layer.

In some embodiments, in the absence of the first electric signal in the third electrode layer and the second electric signal in the fourth electrode layer, the charged particles are uniformly distributed in the second adjustment layer.

Embodiments of the present disclosure further provide a color filter substrate including a first base substrate, a color filter provided on the first base substrate and any one of the refractive index adjustment structures described herein.

In some embodiments, the refractive index adjustment structure is between the color filter and the first base substrate.

In some embodiments, the refractive index adjustment structure is at a side of the first base substrate away from the color filter.

In some embodiments, the color filter substrate further includes a polarizer, the polarizer is on a surface at a light exiting side of the first base substrate, and the refractive index adjustment structure is between the polarizer and the first base substrate.

In some embodiments, the color filter substrate further includes a polarizer, the polarizer is on a surface at a light exiting side of the first base substrate, and the refractive index adjustment structure is at a side of the polarizer away from the first base substrate.

Embodiments of the present disclosure further provide a display panel including any one of the color filter substrates described herein.

In some embodiments, the display panel further includes an array substrate assembled with the color filter substrate. The array substrate includes a second base substrate and a plurality of gate lines and a plurality of data lines provided on the second base substrate. The gate lines and the data lines are made of a material having a reflective index larger than 80%.

Embodiments of the present disclosure further provide a display apparatus including any one of the display panels described herein.

DETAILED DESCRIPTION

To make those skilled in the art better understand the technical solutions of the present disclosure, a refractive index adjustment structure, a color filter substrate, a display panel, and a display apparatus according to the present disclosure will be described in detail below in conjunction with the accompanying drawings.

Due to their advantages such as small volume, low power consumption, radiation-free or the like, the liquid crystal display apparatuses have been widely used in electronic products having various sizes, such as a liquid crystal television, a mobile phone, an on-board display, and the like. The liquid crystal display apparatus includes a liquid crystal display panel and a backlight module for providing a light source. Light emitted from the backlight module irradiates onto the liquid crystal display panel and exits from the liquid crystal display panel at a certain angle after being refracted by the liquid crystal display panel.

As light is emitted from the liquid crystal display panel at an angle in a certain range, the view angle of the liquid crystal display apparatus is fixed accordingly. That is, a user can only clearly view displayed images on the liquid crystal display panel at the angle in the certain range.

However, people have increasing demands on display diversity. When the user is performing online transactions or viewing private files, the liquid crystal display panel is required to have a smaller view angle to protect the user's privacy; and when the user is making a speech or giving a teaching, the liquid crystal display panel is required to have a larger view angle to share the information to be presented to the largest extent.

Thus, a refractive index adjustment structure, a color filter substrate, a display panel, and a display apparatus are urgently needed to address these issues.

Accordingly, the present disclosure provides a refractive index adjustment structure, a color filter substrate, a display panel, and a display apparatus that substantially obviate one or more of the problems due to limitations and disadvantages of the related art.

Figure 1:
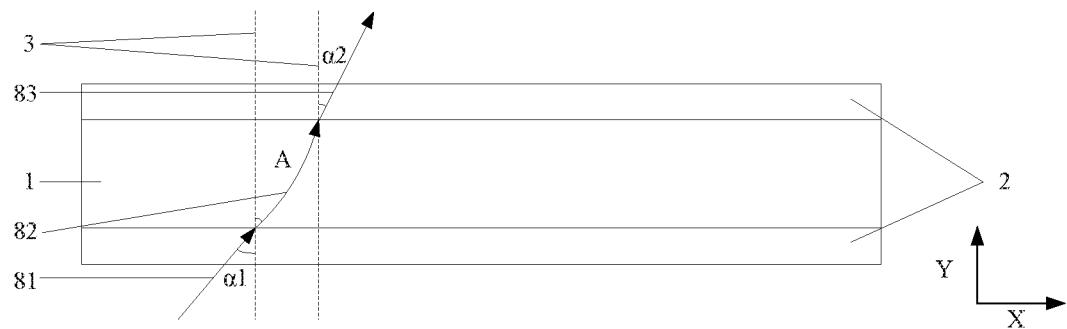
FIG. 1 is a diagram illustrating an optical path in a refractive index adjustment structure in some embodiments according to the present disclosure.
Figure 2:
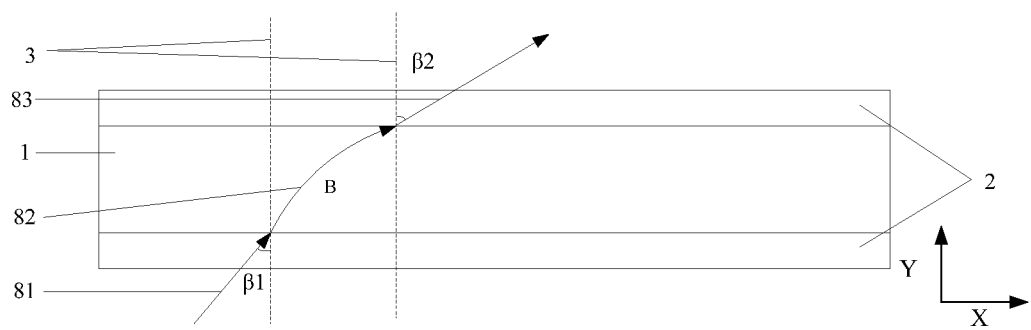
FIG. 2 is a diagram illustrating another optical path in a refractive index adjustment structure in some embodiments according to the present disclosure.

In an aspect, embodiments of the present disclosure provide a refractive index adjustment structure. FIGS. 1 and 2 are diagrams illustrating optical paths in a refractive index adjustment structure in some embodiments according to the present disclosure, FIG. 1 is a diagram illustrating an optical path in the refractive index adjustment structure in some embodiments according to the present disclosure and FIG. 2 is a diagram illustrating another optical path in the refractive index adjustment structure in some embodiments according to the present disclosure. Referring to FIGS. 1 and 2, the refractive index adjustment structure in some embodiments may include an adjustment layer 1 and at least one electrode layer 2 (two electrode layers 2 are illustrated in the drawings by way of example). The adjustment layer 1 and the electrode layer(s) 2 may be provided in a stacked manner. In some embodiments, the electrode layer 2 may be loaded with an electric signal, and the electric signal can adjust a refractive index of the adjustment layer 1. In some embodiments, when the electrode layer 2 is loaded with an electrical signal, the electric signal may cause a portion of the adjustment layer 1 close to a lower surface of the adjustment layer 1 to have a refractive index larger than a refractive index of a portion of the adjustment layer 1 close to an upper surface of the adjustment layer 1. In some embodiments, when the electrode layer 2 is loaded with an electric signal, the electric signal may cause a portion of the adjustment layer 1 close to a lower surface of the adjustment layer 1 to have a refractive index smaller than a refractive index of a portion of the adjustment layer 1 close to an upper surface of the adjustment layer 1.

In a case where the portion of the adjustment layer 1 close to the lower surface of the adjustment layer 1 has the refractive index smaller than the refractive index of the portion of the adjustment layer 1 close to the upper surface of the adjustment layer 1, as illustrated in FIG. 1, incident light 81 enters the adjustment layer 1 from the lower surface of the adjustment layer 1 at an incident angle α1, and refracted light 82 has a path in the adjustment layer 1 as denoted by a curve A; as the refractive index of the adjustment layer 1 gradually decreases in a direction from the upper surface to the lower surface thereof, the refracted light 82 continues to be deflected towards a Y-axis (i.e., a normal direction), such that an emergent angle α2 of emergent light 83 is smaller than the incident angle α1 of the incident light 81, i.e., the emergent light 83 is closer to a normal 3 than the incident light 81. In a case where the portion of the adjustment layer 1 close to the lower surface of the adjustment layer 1 has the refractive index larger than the refractive index of the portion of the adjustment layer 1 close to the upper surface of the adjustment layer 1, as illustrated in FIG. 2, incident light 81 enters the adjustment layer 1 from the lower surface of the adjustment layer 1 at an incident angle β1, and refracted light 82 has a path in the adjustment layer 1 as denoted by a curve B; as the refractive index of the adjustment layer 1 gradually increases in a direction from the upper surface to the lower surface thereof, the refracted light 82 continues to be deflected towards an X-axis, such that an emergent angle β2 of emergent light 83 is larger than the incident angle β1 of the incident light 81, i.e., the emergent light 83 is farther away from the normal 3 than the incident light 81.

In the refractive index adjustment structure according to the embodiments of the present disclosure, the refractive index of the adjustment layer 1 can be adjusted based on the electric signal loaded on the electrode layer 2. When a user is performing online transactions or viewing private files, the electrode layer 2 may be loaded with an electric signal such that the portion of the adjustment layer 1 close to the lower surface of the adjustment layer 1 has a refractive index smaller than a refractive index of the portion of the adjustment layer 1 close to the upper surface of the adjustment layer 1. As such, the light emitted from the upper surface of the adjustment layer 1 is within a smaller range, i.e., the view angle is smaller, thereby protecting the user's privacy. When the user is making a speech or giving a teaching, the electrode layer 2 may be loaded with an electric signal such that the portion of the adjustment layer 1 close to the lower surface of the adjustment layer 1 has a refractive index larger than a refractive index of the portion of the adjustment layer 1 close to the upper surface of the adjustment layer 1. As such, the light emitted from the upper surface of the adjustment layer 1 is within a larger range, i.e., the view angle is larger, thereby sharing the information to be presented to the largest extent.

It should be noted that in order to increase transmittance of the refractive index adjustment structure, the electrode layer 2 in some embodiments may be made of a transparent conductive material. Examples of appropriate transparent conductive materials for making the electrode layer 2 include, but are not limited to, indium tin oxide, nano-silver, or grapheme.

The specific structure and operating procedure of the refractive index adjustment structure according to the embodiments of the present disclosure will be described in detail below by taking two specific implementations as examples.

Figure 3:
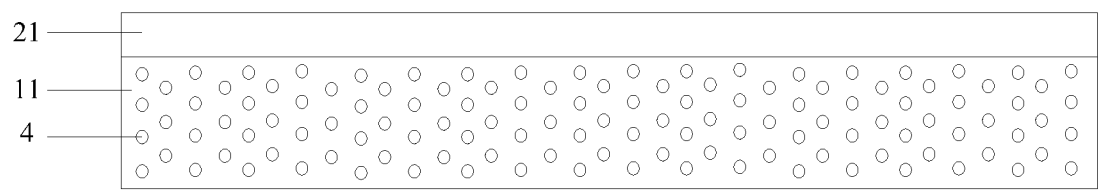
FIG. 3 is a diagram illustrating a structure of a refractive index adjustment structure including magnetic particles in some embodiments according to the present disclosure.
Figure 4:
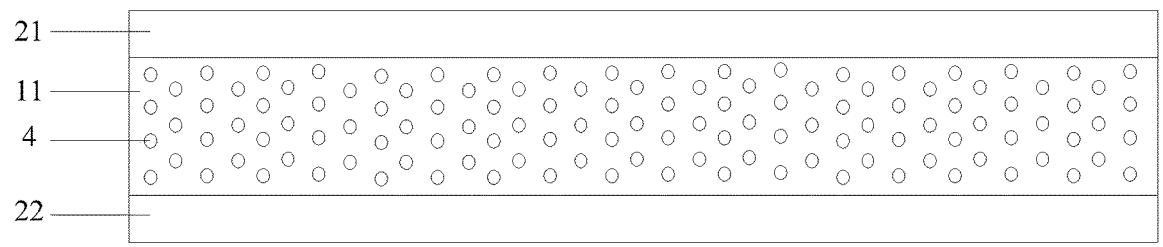
FIG. 4 is a diagram illustrating another structure of a refractive index adjustment structure including magnetic particles in some embodiments according to the present disclosure.

As an implementation, the refractive index of the adjustment layer 1 is adjusted by means of a magnetic field. FIG. 3 is a diagram illustrating a structure of a refractive index adjustment structure including magnetic particles in some embodiments according to the present disclosure. FIG. 4 is a diagram illustrating another structure of a refractive index adjustment structure including magnetic particles in some embodiments according to the present disclosure. As illustrated in FIG. 3, the refractive index adjustment structure in some embodiments may include a first electrode layer 21 and a first adjustment layer 11 doped with magnetic particles 4. The first electrode layer 21 may be loaded with a third electric signal, from which a first magnetic field that can adjust distribution of the magnetic particles 4 in a direction perpendicular to the first electrode layer 21 can be generated. Specifically, the magnetic particles 4 can move freely within the first adjustment layer 11, and when the first electrode layer 21 is loaded with the third electric signal, the first electrode layer 21 can generate the first magnetic field based on the loaded third electric signal. The magnetic particles 4 are attracted, due to the magnetic force of the first magnetic field, to be more intensively distributed in a portion of the first adjustment layer 11 close to the first electrode layer 21.

It should be noted that the first adjustment layer 11 may be a non-magnetic solvent, and the magnetic particle may be a nano-particle of iron, cobalt, nickel, or iron nitride. The third electric signal may be a current signal, when the first electrode layer 21 is loaded with the third electric signal, the positively or negatively charged particles can move directionally, and the movement of the charged particles can generate the first magnetic field.

When the first electrode layer 21 is loaded with the third electric signal, the magnetic particles 4 move towards the side of the first electrode layer 21 under the action of the first magnetic field. In the embodiments of the present disclosure, the description is given by taking that the first electrode layer 21 is located on an upper surface of the first adjustment layer 11 as an example, and when the first electrode layer 21 is loaded with the third electric signal, the magnetic particles 4 move towards the upper surface side of the first adjustment layer 11, such that a density of the magnetic particles 4 in the first adjustment layer 11 decreases in a direction from the upper surface to a lower surface thereof, and accordingly, the refractive index of the first adjustment layer 11 decreases in the direction from the upper surface to the lower surface thereof. As such, when light enters from the lower surface side of the first adjustment layer 11, the view angle at the upper surface side of the first adjustment layer 11 is smaller, thereby protecting the user's privacy.

Optionally, as illustrated in FIG. 4, the refractive index adjustment structure in some embodiments further includes a second electrode layer 22, the second electrode layer 22 is located on the lower surface of the first adjustment layer 11, and the second electrode layer 22 may also be loaded with the third electric signal.

When the second electrode layer 22 is loaded with the third electric signal, the second electrode layer 22 can generate a second magnetic field based on the third electric signal, and the magnetic particles 4 can be attract, due to the magnetic force of the second magnetic field, to move towards the lower surface side of the first adjustment layer 11, such that the density of the magnetic particles 4 in the first adjustment layer 11 increases in a direction from the upper surface to the lower surface thereof, and accordingly, the refractive index of the first adjustment layer 11 increases in the direction from the upper surface to the lower surface thereof. As such, when light enters from the lower surface side of the first adjustment layer 11, the view angle at the upper surface side of the first adjustment layer 11 is larger, thereby sharing the information to be presented to the largest extent.

It should be noted that when both of the first electrode layer 21 and the second electrode layer 22 are not loaded with the third electric signal, the magnetic particles 4 may be uniformly distributed in the first adjustment layer 11 under the effect of Brownian movement, so that the whole first adjustment layer 11 has a same refractive index. As such, the first adjustment layer 11 may not change the light transmission direction, i.e., the view angle will be kept unchanged.

Figure 5:
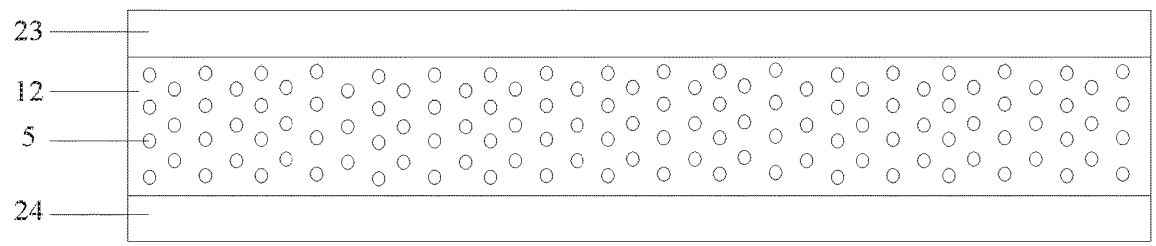
FIG. 5 is a diagram illustrating a structure of a refractive index adjustment structure including charged particles in some embodiments according to the present disclosure.

As another implementation, the refractive index of the adjustment layer 1 is adjusted by means of an electric field. FIG. 5 is a diagram illustrating a structure of a refractive index adjustment structure including charged particles in some embodiments according to the present disclosure. As illustrated in FIG. 5, the refractive index adjustment structure in some embodiments may include a third electrode layer 23, a fourth electrode layer 24, and a second adjustment layer 12 doped with charged particles 5. The second adjustment layer 12 is located between the third electrode layer 23 and the fourth electrode layer 24. In the embodiments of the present disclosure, the description is given by taking that the third electrode layer 23 is located on an upper surface of the second adjustment layer 12 and the fourth electrode layer 24 is located on a lower surface of the second adjustment layer 12 as an example. The third electrode layer 23 may be loaded with a first electric signal and the fourth electrode layer 24 may be loaded with a second electric signal. Specifically, the charged particles 5 can move freely within the second adjustment layer 12, and an electric field is generated between the third electrode layer 23 and the fourth electrode layer 24 when the third electrode layer 23 is loaded with the first electric signal and the fourth electrode layer 24 is loaded with the second electric signal not equal to the first electric signal. Under the action of the electric field, the charged particles 5 may be more intensively distributed in a portion of the second adjustment layer 12 close to the third electrode layer 23 or may be more intensively distributed in a portion of the second adjustment layer 12 close to the fourth electrode layer 24.

In some embodiments, the second electrode layer 12 may be a non-conductive solvent, such that no additional insulating layer is needed. In some embodiments, the second electrode layer 12 may be a conductive solvent, and in this case, insulating layers are required to be provided between the third electrode layer 23 and the second electrode layer 12 and between the fourth electrode layer 24 and the second electrode layer 12, respectively.

In some embodiments, each of the first electric signal and the second electric signal may be a voltage signal. In some embodiments, the first electric signal is higher than the second electric signal. In a case where the first electric signal is higher than the second electric signal, the formed electric field has a direction from up to down vertically; under the action of the electric filed: in a case where the charged particles 5 are positively charged particles, the charged particles 5 are more intensively distributed in the portion of the second adjustment layer 12 close to the fourth electrode layer 24; and in a case where the charged particles 5 are negatively charged particles, the charged particles 5 are more intensively distributed in the portion of the second adjustment layer 12 close to the third electrode layer 23. In some embodiments, the first electric signal is lower than the second electric signal. In a case where the first electric signal is lower than the second electric signal, the formed electric field has a direction from down to up vertically; under the action of the electric filed: in a case where the charged particles 5 are positively charged particles, the charged particles 5 are more intensively distributed in the portion of the second adjustment layer 12 close to the third electrode layer 23; and in a case where the charged particles 5 are negatively charged particles, the charged particles 5 are more intensively distributed in the portion of the second adjustment layer 12 close to the fourth electrode layer 24.

In a case where the charged particles 5 are more intensively distributed in the portion of the second adjustment layer 12 close to the third electrode layer 23, a density of the charged particles 5 in the second adjustment layer 12 gradually decreases in a direction from the upper surface to the lower surface thereof, and accordingly, the refractive index of the second adjustment layer 12 gradually decreases in the direction from the upper surface to the lower surface thereof. As such, when light enters from the lower surface side of the second adjustment layer 12, the view angle at the upper surface side of the second adjustment layer 12 is smaller, thereby protecting the user's privacy. In a case where the charged particles 5 are more intensively distributed in the portion of the second adjustment layer 12 close to the fourth electrode layer 24, a density of the charged particles 5 in the second adjustment layer 12 gradually increases in the direction from the upper surface to the lower surface thereof, and accordingly, the refractive index of the second adjustment layer 12 gradually increases in the direction from the upper surface to the lower surface thereof. As such, when light enters from the lower surface side of the second adjustment layer 12, the view angle at the upper surface side of the second adjustment layer 12 is larger, thereby sharing the information to be presented to the largest extent.

In some embodiments, when the third electrode layer 23 is not loaded with the first electric signal and the fourth electrode layer 24 is not loaded with the second electric signal, the charged particles 5 may be uniformly distributed in the second adjustment layer 12 under the effect of Brownian movement, so that the whole second adjustment layer 11 has a same refractive index. As such, the second adjustment layer 12 may not change the light transmission direction, i.e., the view angle will be kept unchanged.

Figure 6:
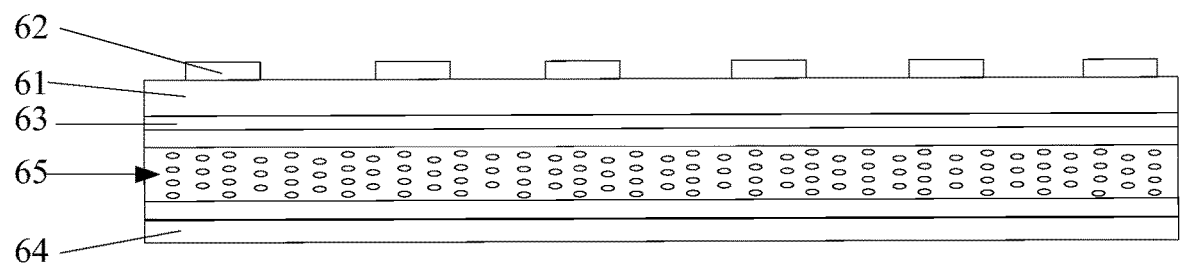
FIG. 6 is a diagram illustrating a structure of a color filter substrate in some embodiments according to the present disclosure.

In another aspect, embodiments of the present disclosure further provide a color filter substrate. FIG. 6 is a diagram illustrating a structure of a color filter substrate in some embodiments according to the present disclosure. As illustrated in FIG. 6, the color filter substrate 6 in some embodiments includes a first base substrate 61, a color filter 62 provided on the first base substrate 61, and the refractive index adjustment structure 65 according to any one of the embodiments of the present disclosure. The refractive index adjustment structure 65 may be provided at a side of the first base substrate 61 away from the color filter 62. In some embodiments, the refractive index adjustment structure 65 may be provided on a surface of the first base substrate 61 away from the color filter 62.

Light emitted from the color filter 62 may enters the refractive index adjustment structure 65. When the user is performing online transactions or viewing private files, the refractive index adjustment structure 65 may cause the light from the color filter 62 to have a smaller range and thus the view angle is smaller, thereby protecting the user's privacy; and when the user is making a speech or giving a teaching, the refractive index adjustment structure 65 may cause the light from the color filter 62 to have a larger range and thus the view angle is larger, thereby sharing the information to be presented to the largest extent. The configurations and the refractive index adjustment of the refractive index adjustment structure 65 may refer to the contents described above, and will not be repeated here.

In some embodiments, the refractive index adjustment structure 65 is located between the color filter 62 and the first base substrate 61. In an example, the refractive index adjustment structure 65 is formed on the first base substrate 61, and then the color filter 62 is formed on a side of the refractive index adjustment structure 65 away from the first base substrate 61.

In order to ensure flatness of a surface of the refractive index adjustment structure 65, in some embodiments, a planarization layer 63 may be provided between the refractive index adjustment structure 65 and the first base substrate 61.

As illustrated in FIG. 6, the color filter substrate in some embodiments may further include a polarizer 64, the polarizer 64 is provided on a surface at a light exiting side of the first base substrate 61. In some embodiments, the refractive index adjustment structure 65 is located at the side of the first base substrate 61 away from the color filter 62, and the polarizer 64 may be located between the refractive index adjustment structure 65 and the first base substrate 61. In some embodiments, the refractive index adjustment structure 65 is located at the side of the first base substrate 61 away from the color filter 62, and the polarizer 64 may be located at the side of the refractive index adjustment structure 65 away from the first base substrate 61.

Figure 7:
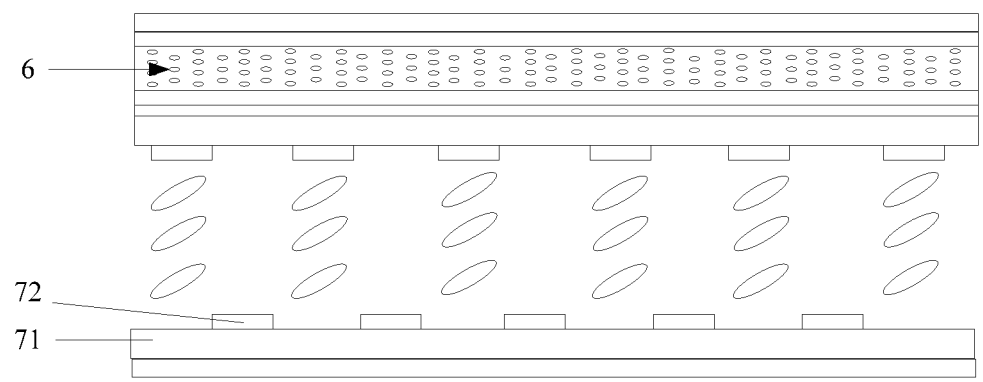
FIG. 7 is a diagram illustrating a structure of a display panel in some embodiments of the present disclosure.

In another aspect, embodiments of the present disclosure further provide a display panel. FIG. 7 is a diagram illustrating a structure of a display panel in some embodiments of the present disclosure. As illustrated in FIG. 7, the display panel in some embodiments includes the color filter substrate 6 according to any one of the embodiments of the present disclosure.

As illustrated in FIG. 7, the display panel may further include an array substrate 7 assembled with the color filter substrate 6. The array substrate 7 may include a second base substrate 71, a plurality of gate lines (not shown) provided on the second base substrate 71 and a plurality of data lines 72 provided on the second base substrate 71. In some embodiments, the gate lines and the data lines 72 are made of a material having a reflective index larger than 80%. As such, the light reflected by the color filter substrate 6 may re-enter the color filter substrate 6 after being reflected by the gate lines and the data lines 72, such that the display brightness of the display panel can be increased.

In another aspect, embodiments of the present disclosure further provide a display apparatus, including the display panel according to any one of the embodiments of the present disclosure. The display apparatus may be any product or part with liquid crystal display function, such as an electronic paper, a mobile phone, a tablet computer, a television, a digital photo frame, or the like.

It can be understood that the foregoing embodiments are merely exemplary embodiments used for describing the principle of the present disclosure, but the present disclosure is not limited thereto. Those of ordinary skill in the art may make various variations and improvements without departing from the spirit and essence of the present invention, and these variations and improvements shall also fall into the protection scope of the present disclosure.

What is claimed is:

1. A color filter substrate, comprising a first base substrate, a color filter provided on the first base substrate, and a refractive index adjustment structure, light emitted from the color filter entering the refractive index adjustment structure, wherein the refractive index adjustment structure comprises an adjustment layer and at least one electrode layer, wherein the adjustment layer and the at least one electrode layer are provided in a stacked manner, and the at least one electrode layer is configured to be loaded with an electric signal, the electric signal being capable of adjusting a refractive index of the adjustment layer,
   wherein in response to the at least one electrode layer being loaded with the electric signal, the refractive index of the adjustment layer is caused to gradually decrease or increase in a direction from an upper surface of the adjustment layer to a lower surface of the adjustment layer, such that refracted light continues to be deflected towards a same direction in the adjustment layer along a curve, and
   wherein the adjustment layer is doped with magnetic particles or charged particles.

2. The color filter substrate of claim 1, wherein the at least one electrode layer comprises a first electrode layer, and the adjustment layer is a first adjustment layer doped with magnetic particles; and
   the first electrode layer is configured to generate a magnetic field based on the electric signal, and the magnetic field is capable of adjusting distribution of the magnetic particles in the first adjustment layer in a direction perpendicular to the first electrode layer.

3. The color filter substrate of claim 2, wherein in response to the electric signal loaded onto the first electrode layer, a portion of the first adjustment layer close to the first electrode layer has a refractive index larger than a refractive index of a portion of the first adjustment layer away from the first electrode layer.

4. The color filter substrate of claim 2, wherein in the absence of the electric signal in the first electrode layer, the magnetic particles are uniformly distributed in the first adjustment layer.

5. The color filter substrate of claim 1, wherein the at least one electrode layer comprises a first electrode layer and a second electrode layer, the adjustment layer is a first adjustment layer doped with magnetic particles, the first adjustment layer is between the first electrode layer and the second electrode layer, and the electric signal is loaded onto the first electrode layer or the second electrode layer;
   the first electrode layer is configured to generate a first magnetic field based on the electric signal, and the first magnetic field is capable of adjusting distribution of the magnetic particles in the first adjustment layer in a direction perpendicular to the first electrode layer; and
   the second electrode layer is configured to generate a second magnetic field based on the electric signal, and the second magnetic field is capable of adjusting the distribution of the magnetic particles in the first adjustment layer in a direction perpendicular to the second electrode layer.

6. The color filter substrate of claim 5, wherein in response to the electric signal loaded onto the first electrode layer, a portion of the first adjustment layer close to the first electrode layer has a refractive index larger than a refractive index of a portion of the first adjustment layer away from the first electrode layer; and in response to the electric signal loaded onto the second electrode layer, a portion of the first adjustment layer close to the second electrode layer has a refractive index larger than a refractive index of a portion of the first adjustment layer away from the second electrode layer.

7. The color filter substrate of claim 5, wherein in the absence of the electric signal in both of the first electrode layer and the second electrode layer, the magnetic particles are uniformly distributed in the first adjustment layer.

8. The color filter substrate of claim 1, wherein the at least one electrode layer comprises a third electrode layer and a fourth electrode layer, the adjustment layer is a second adjustment layer doped with charged particles, and the second adjustment layer is between the third electrode layer and the fourth electrode layer; and the electric signal comprises a first electric signal and a second electric signal, the third electric layer is configured to be loaded with the first electric signal and the fourth electrode layer is configured to be loaded with the second electric signal, the third electrode layer and the fourth electrode layer are configured to generate an electric field based on the first electric signal and the second electric signal, and the electric field is capable of adjusting distribution of the charged particles in the second adjustment layer in a direction perpendicular to the third electrode layer and fourth electrode layer.

9. The color filter substrate of claim 8, wherein the charged particles are positively charged particles,
  in a case where the first electric signal is higher than the second electric signal, a portion of the second adjustment layer close to the third electrode layer has a refractive index smaller than a refractive index of a portion of the second adjustment layer close to the fourth electrode layer; and
  in a case where the first electric signal is lower than the second electric signal, the portion of the second adjustment layer close to the third electrode layer has a refractive index larger than a refractive index of the portion of the second adjustment layer close to the fourth electrode layer.

10. The color filter substrate of claim 8, wherein the charged particles are negatively charged particles,
  in a case where the first electric signal is lower than the second electric signal, a portion of the second adjustment layer close to the third electrode layer has a refractive index smaller than a refractive index of a portion of the second adjustment layer close to the fourth electrode layer; and
  in a case where the first electric signal is higher than the second electric signal, the portion of the second adjustment layer close to the third electrode layer has a refractive index larger than a refractive index of the portion of the second adjustment layer close to the fourth electrode layer.

11. The color filter substrate of claim 8, wherein in the absence of the first electric signal in the third electrode layer and the second electric signal in the fourth electrode layer, the charged particles are uniformly distributed in the second adjustment layer.

12. The color filter substrate of claim 1, wherein the refractive index adjustment structure is between the color filter and the first base substrate.

13. The color filter substrate of claim 1, wherein the refractive index adjustment structure is at a side of the first base substrate away from the color filter.

14. The color filter substrate of claim 1, further comprising a polarizer, the polarizer is on a surface at a light exiting side of the first base substrate; and
  the refractive index adjustment structure is between the polarizer and the first base substrate.

15. The color filter substrate of claim 1, further comprising a polarizer, the polarizer is on a surface at a light exiting side of the first base substrate; and
  the refractive index adjustment structure is at a side of the polarizer away from the first base substrate.

16. A display panel, comprising the color filter substrate according to claim 1.

17. The display panel of claim 16, further comprising an array substrate assembled with the color filter substrate;
  the array substrate comprises a second base substrate and a plurality of gate lines and a plurality of data lines provided on the second base substrate, the plurality of gate lines and the plurality of data lines are made of a material having a reflective index larger than 80%.

18. A display device, comprising the display panel according to claim 16.

* * * * *